United States Patent [19]
Hong

[11] Patent Number: 5,995,237
[45] Date of Patent: Nov. 30, 1999

[54] DEVICE FOR COMPRESSING STILL IMAGE DATA

[75] Inventor: Min-Suk Hong, Suwon, Rep. of Korea

[73] Assignee: Samsung Electronics Co., Ltd., Kyungki-do, Rep. of Korea

[21] Appl. No.: 08/679,487

[22] Filed: Jul. 12, 1996

[30]  Foreign Application Priority Data

Jan. 29, 1996 [KR] Rep. of Korea ...................... P96-1960

[51] Int. Cl.⁶ .......................... H04N 1/415; H04N 1/417; H04N 7/12; G06K 9/36
[52] U.S. Cl. .................................. 358/261.2; 358/261.3; 358/426; 348/405; 382/232
[58] Field of Search .................................. 348/402, 403, 348/405, 415, 416; 382/232, 236, 248, 250; 358/261.2, 261.3, 430, 432, 426

[56] References Cited

U.S. PATENT DOCUMENTS

| | | | |
|---|---|---|---|
| 5,404,168 | 4/1995 | Yamada et al. | 348/405 |
| 5,530,478 | 6/1996 | Sasaki et al. | 348/405 |
| 5,686,964 | 11/1997 | Tabatabai et al. | 348/405 |

*Primary Examiner*—Edward L. Coles
*Assistant Examiner*—Mark Wallerson
*Attorney, Agent, or Firm*—Sughrue, Mion, Zinn, Macpeak & Seas, PLLC

[57] ABSTRACT

A device for compressing still image data has a discrete cosine transformer for discrete-cosine-transforming video data output in block units from a frame buffer in a digital camcorder, a quantizer for quantizing the video data transformed in the discrete cosine transformer, a variable-length coder for variable-length-coding the video data quantized in the quantizer, and a quantization interval determiner for producing a quantizer number for controlling a quantization interval, and outputting the quantizer number to the quantizer. The device further has a comparator for comparing the bit number of video data variable-length-coded at quantization intervals for the first frame with a reference bit number for the best image quality, and outputting a flag signal on the basis of the comparison, and a flag buffer for temporally storing the flag signal output from the comparator, so that the quantization interval is determined according to the result of the comparison output from the flag buffer to make the bit number of the video data of the frames following the first frame approximately equal to the predetermined reference bit number for the best image quality. Since the bit number of variable-length-coded data of the first frame is compared with its reference bit number, and a quantizer number for the following frame is determined on the basis of the comparison, the bit number of the second frame data is approximately equal to its reference bit number resulting in high quality still image.

4 Claims, 1 Drawing Sheet

DEVICE FOR COMPRESSING STILL IMAGE DATA

BACKGROUND OF THE INVENTION

The present invention relates to a device for compressing video data, and more particularly, to a device for compressing still image data to obtain a still image of high image quality.

Generally, a digital camcorder functionally provides a still image photographing mode as well as a moving picture photographing mode. In the moving picture photographing mode, video data is compressed frame by frame and continuously recorded in a recording medium, while in the still image photographing mode, a frame of video data is stored in a frame buffer, compressed, and recorded on a tape for several to tens of seconds.

The human eye is more sensitive to the quality of a reproduced still image than that of a reproduced moving picture, since the reproduced image is displayed in a still state.

Also, in many cases, a photographed still image is output according to its uses by equipment (e.g., a color printer) capable of displaying an image of high resolution, thus increasing the need for high image quality.

FIG. 1 is a schematic block diagram of a conventional device for compressing still image data.

The still-image data compression device of FIG. 1 is comprised of a discrete cosine transformer 10 for discrete-cosine transforming and zigzag-scanning video data received in 8×8 block units from a frame buffer (not shown) in a digital camcorder, a quantizer 12 for quantizing the video data output from discrete cosine transformer 10 at predetermined quantization intervals, a quantization interval determiner 16 for determining a quantizer number according to the complexity of the video data output in block units from discrete cosine transformer 10, so that quantizer 12 selects an adequate quantization interval or step size for each of macroblocks per second, and a variable-length coder 14 for variable-length-coding the video data quantized at the predetermined quantization intervals in quantizer 12, and outputting the variable-length-coded data to an error correction coder (not shown).

The quantizer number output from quantization interval determiner 16 has a direct impact on the determination of the image quality. In the prior art of FIG. 1, however, an identical quantizer number is selected to determine a quantization interval in both the still image photographing mode and the moving picture photographing mode.

As a rule, errors are typically present in video data processed in variable-length coder 14. Nevertheless, despite the presence of an error in the value of a quantizer number selected for the data of the first frame, a high-quality image can be reproduced only if a more accurate quantizer number is selected for the next frame data on the basis of the comparison of a reference bit number with the bit number of the first frame data, since several frames per second possess identical video data in a still image.

In the prior art, however, high image quality cannot be obtained since an identical quantizer number selected in a moving picture photographing mode is also used in a still image photographing mode.

SUMMARY OF THE INVENTION

To overcome the above problem, the object of the present invention is to provide a device for compressing still image data to obtain a still image of high image quality.

To achieve the above object, there is provided a device for compressing still image data comprising: a discrete cosine transformer for discrete-cosine transforming video data output in block units from a frame buffer in a digital camcorder; a quantizer for quantizing the video data transformed in the discrete cosine transformer; a variable-length coder for variable-length coding the video data quantized in the quantizer; a quantization interval determiner for producing a quantizer number for controlling the quantization interval, and outputting the quantizer number to the quantizer; a comparator for comparing the bit number of video data variable-length-coded at quantization intervals for a first frame with a reference bit number for the best image quality, and outputting a flag signal on the basis of the comparison; and a flag buffer for temporally storing the flag signal output from the comparator, wherein the quantization interval is determined according to the result of the comparison output from the flag buffer, so that the bit number of video data of the frames following the first frame are approximate to the predetermined reference bit number for the optimum image quality.

According to the present invention, it is preferable that the quantization interval determiner receives a control signal for controlling a still image photographing mode, establishes the bit number of the video data of the first frame as the same quantization interval as that of a frame of video data that is used in a moving picture photographing mode, and adjusts a quantizer number for the frame following the first frame on the basis of the comparison between the bit number of the video data variable-length-coded in the quantization interval for the video data of the first frame and the predetermined reference bit number for the best image quality, in such a way that the quantization number for the frame following the first frame is decreased, incremented, and kept intact, in the respective cases where the bit number is larger than, smaller than, and equal to the reference bit number.

Preferably, the comparator outputs flag signals indicating that the bit number of the video data of a frame following the first frame is larger than, smaller than, and equal to the predetermined reference bit number, on the basis of the comparison between the bit number of the video data of the first frame output from the variable-length coder and the predetermined reference bit number for the best image quality.

Preferably, the flag buffer stores a flag signal output from the comparator each time a bit number is fixed, and the flag signal is output when the next frame is processed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
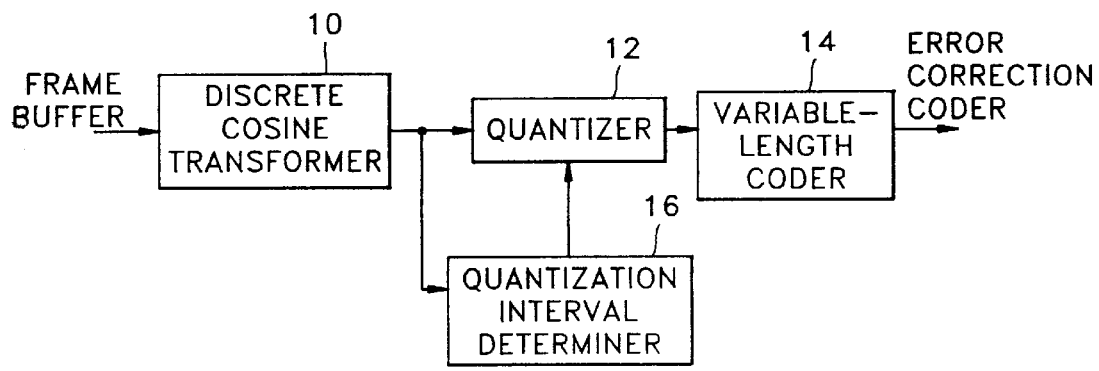
FIG. 1 is a schematic block diagram of a conventional device for compressing still image data.
Figure 2:
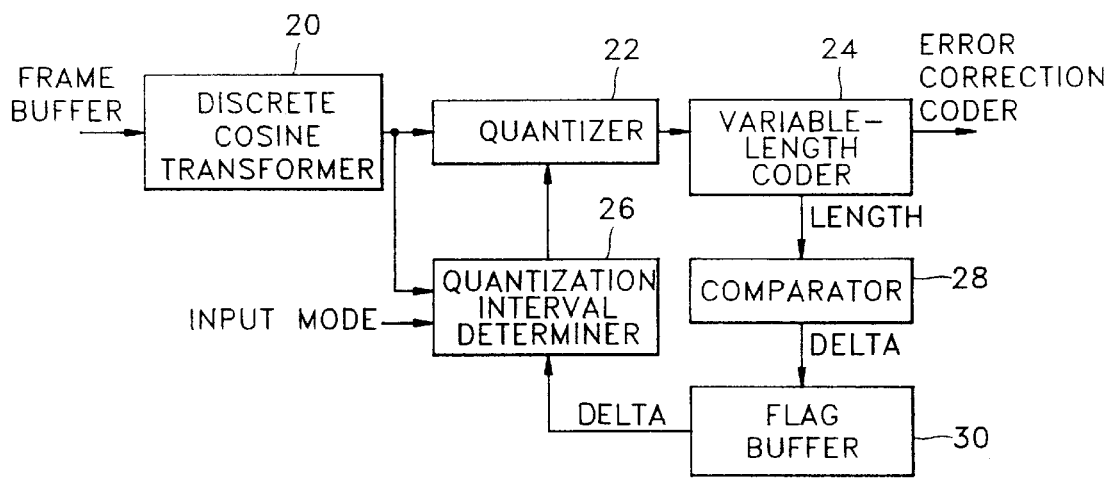
FIG. 2 is a schematic block diagram of a device for compressing still image data according to a preferred embodiment of the present invention.

In FIG. 2, showing a device for compressing still image data according to a preferred embodiment of the present invention, the still-image data compressing device is comprised of a discrete cosine transformer 20 for discrete-cosine transforming and zigzag-scanning video data received in 8×8 block units from a frame buffer (not shown) in a digital camcorder, a quantizer 22 for quantizing the video data output from discrete cosine transformer 20, a variable-length coder 24 for variable-length-coding the video data quantized in quantizer 22 and outputting the variable-length-coded data to an error correction coder (not shown), a quantization interval determiner 26 for determining a quantization interval according to the activation degree of the video data output from discrete cosine transformer 20, a comparator 28 for comparing a predetermined reference bit number with the bit number of the variable-length-coded data output from variable-length coder 24, and outputting respective flag signals for the data bit number larger than, smaller than, and equal to the reference bit number, and a flag buffer 30 for temporarily storing the flag signal output in frame units from comparator 28 and outputting the flag signal to quantization interval determiner 26.

Here, a signal "LENGTH" input from variable-length coder 24 to comparator 28 indicates the bit number of variable-length-coded data. The "DELTA" signals input from comparator 28 to flag buffer 30 and from flag buffer 30 to quantization interval determiner 26 indicate the result of the comparison between the reference bit number and the bit number of the variable-length-coded data, that is, above, below or equal.

To achieve the best image quality, quantization interval determiner 26 determines a quantizer number according to a received flag signal, so that the bit number of frame data is approximated to its reference bit number. Quantizer 22 performs a quantization operation on the basis of the determined quantizer number. Incidently, the reference bit number can be set during manufacturing using a series of simulation to achieve the highest quality picture.

The still-image data compressing device of the present invention as constituted above operates as follows.

Fixing the number of data bits in the present invention is needed for search and high-speed playback operations in a sequential recording medium such as a recording tape, and this fixed bit-number unit can be modified, when necessary for applications.

Given an 8×8 block as a discrete cosine block, a macroblock has four luminance blocks and two color difference blocks.

A single fixed bit-number unit is comprised of at least one macroblock.

Data is generally produced in macroblock units. When a macroblock of data is variable-length-coded, the bit number of the data may be larger than, smaller than, or equal to a reference bit number.

If the bit number of the data does not reach the reference bit number, the image quality is lower, in comparison with the case where they are identical. On the other hand, if the bit number of the data exceeds the reference bit number, the excess bits are wasted (not recorded). With the waste of the excess video data bits from a low frequency area, which is an important factor in determining image quality, a high-frequency coefficient is absent, thereby preventing the display of a subtle portion of the image, and causing blocking due to difference from an adjacent block.

When a still image is photographed, the human eye is very sensitive to its image quality, since a signal stored in the frame buffer is recorded as the same video data for several to tens of seconds. On the contrary, a possible momentary distortion of a signal for a moving picture is elusive to the human eye. Therefore, the still image should be accurately played back.

For this purpose, a quantizer number for more accurately determining a quantization interval should be determined when still image data is compressed.

When a still image photographing mode is set in a camcorder, quantization interval determiner 26 detects a control signal for the still image photographing mode, and a signal stored in the frame buffer is input to discrete cosine transformer 20, a quantizer number for the video data of the first frame is determined according to the activation degree of a discrete cosine parameter, in the same manner as in a moving picture photographing mode.

However, since each frame has an identical signal in the still image photographing mode, quantization intervals for frames from the second and on are adjusted on the basis of the comparison between the bit number of variable-length-coded data in the first frame and its reference bit number, thereby narrowing the difference between the bit number of the video data in the other frames and the reference bit number. Thus, intended high image quality can be achieved.

As described above, the device for compressing still image data of the present invention compares the bit number of variable-length-coded video data of the first frame with its reference bit number for the best image quality, and adjusts quantization intervals for the other frames on the basis of the comparison, so that the bit numbers of the other frames are approximate to their reference bit numbers. Therefore, higher image quality can be achieved in a still image photographing mode than in a moving picture photographing mode.

What is claimed is:

1. A device for compressing still image data comprising:
    a discrete cosine transformer for discrete-cosine transforming video data received in block units from a frame buffer;
    a quantizer for quantizing said video data transformed in said discrete cosine transformer;
    a variable-length coder for variable-length coding said video data quantized in said quantizer;
    a quantization interval determiner for producing a quantizer number for controlling a quantization interval, and outputting said quantizer number to said quantizer;
    a comparator for comparing bit number of video data of the first frame of the still image data with a reference bit number for best image quality, and outputting a flag signal on the basis of the comparison; and
    wherein said quantization interval determiner is responsive to said flag signal to produce the quantizer number so that the bit number of video data of the frames following the first frame are approximate to the predetermined reference bit number.

2. A device for compressing still image data as claimed in claim 1, wherein said quantization interval determiner receives a control signal for controlling a still image photographing mode and in response thereto establishes the bit number of the video data of said first frame as the same quantization interval as that of a frame of video data that is used in a moving picture photographing mode, and adjusts the quantizer number for a frame following said first frame on the basis of the flag signal to approximate said reference bit number.

3. A device for compressing still image data as claimed in claim 1, wherein said comparator outputs flag signals indicating that the bit number of the video data of a frame following said first frame is respectively larger than, smaller than, and equal to the predetermined reference bit number.

4. A device for compressing still image data as claimed in claim 1 further comprising a flag buffer, wherein said flag buffer stores the flag signal output from said comparator each time a bit number is fixed, and said flag signal is output when the next frame is processed.

* * * * *